United States Patent
Russ et al.

(10) Patent No.: US 9,714,098 B2
(45) Date of Patent: Jul. 25, 2017

(54) RAT ACTUATOR FINE ADJUSTMENT ASSEMBLY

(75) Inventors: David Everett Russ, Rockford, IL (US); Gary Sasscer, Leaf River, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 795 days.

(21) Appl. No.: 13/460,999

(22) Filed: May 1, 2012

(65) Prior Publication Data

US 2013/0292509 A1    Nov. 7, 2013

(51) Int. Cl.
*B64D 41/00*     (2006.01)
*F16H 25/20*     (2006.01)

(52) U.S. Cl.
CPC .... B64D 41/007 (2013.01); *F16H 2025/2059* (2013.01); *Y10T 74/18576* (2015.01); *Y10T 74/18704* (2015.01)

(58) Field of Classification Search
CPC ....... B64D 41/007; B64D 41/00; F16H 25/20; F16H 2025/204; F16H 25/2015; F16H 2025/2059; F05B 2220/31; B64C 13/30; F16D 65/56
USPC ................ 244/58; 74/89.23, 89.39
See application file for complete search history.

(56) References Cited

U.S. PATENT DOCUMENTS

| | | | | |
|---|---|---|---|---|
| 2,464,873 A * | 3/1949 | Lear | | 74/89.39 |
| 2,746,314 A * | 5/1956 | Donovan | | 74/424 |
| 2,899,613 A * | 8/1959 | Jennings | | 361/279 |
| 3,295,385 A * | 1/1967 | Jenny | | F16H 25/2266 |
| | | | | 74/89.39 |
| 3,403,365 A * | 9/1968 | Richards | | F15B 15/2823 |
| | | | | 336/30 |
| 3,504,537 A * | 4/1970 | Cline | | 73/126 |
| 3,536,168 A * | 10/1970 | Newstead | | 188/79 |
| 3,828,625 A * | 8/1974 | Bruhn, Jr. | | 74/512 |
| 4,484,732 A * | 11/1984 | Gould | | 267/64.14 |
| 4,742,976 A * | 5/1988 | Cohen | | 244/58 |
| 4,766,980 A * | 8/1988 | Engle | | 188/52 |
| 4,870,871 A * | 10/1989 | Ivan | | 74/513 |
| 5,820,074 A * | 10/1998 | Trommer et al. | | 244/58 |
| 6,382,559 B1 * | 5/2002 | Sutterfield | | B64C 15/02 |
| | | | | 244/12.4 |
| 6,546,825 B1 * | 4/2003 | Kugle | | F16H 25/2015 |
| | | | | 192/141 |
| 7,416,392 B2 * | 8/2008 | Russ | | 416/142 |

(Continued)

FOREIGN PATENT DOCUMENTS

CN    102198860 A    9/2011

OTHER PUBLICATIONS

Chinese Office Action from Chinese Application Serial No. 201310157762.8, Dated Jan. 29, 2016, 19 pages.

*Primary Examiner* — Joseph W Sanderson
*Assistant Examiner* — Steven Hawk
(74) *Attorney, Agent, or Firm* — Kinney & Lange, P.A.

(57) ABSTRACT

A ram air turbine system includes an actuator having a threaded portion, a rod having a threaded region at or near one end and an eyelet at an opposite end, and a bushing. The bushing has a first thread engaged with the threaded portion of the actuator, and a second thread engaged with the threaded region of the rod, such that an actuation force can be transmitted between the actuator and the rod through the bushing. The first and second threads of the bushing have different pitches.

20 Claims, 3 Drawing Sheets

(56) References Cited

U.S. PATENT DOCUMENTS

| | | | | |
|---|---|---|---|---|
| 7,842,010 | B2* | 11/2010 | Bonnette et al. | 604/131 |
| 7,963,529 | B2* | 6/2011 | Oteman | B60G 13/001 |
| | | | | 188/266 |
| 8,113,522 | B2* | 2/2012 | Oteman | B60G 13/001 |
| | | | | 280/5.514 |
| 8,256,311 | B2* | 9/2012 | Payne et al. | 74/89.37 |
| 8,819,940 | B2* | 9/2014 | Rosengren et al. | 29/898.12 |
| 2005/0066763 | A1* | 3/2005 | Cable | G05G 1/54 |
| | | | | 74/504 |
| 2007/0237640 | A1 | 10/2007 | Russ | |
| 2011/0236218 | A1* | 9/2011 | Russ et al. | 416/246 |
| 2012/0048041 | A1* | 3/2012 | Rosengren et al. | 74/89.23 |

\* cited by examiner

RAT ACTUATOR FINE ADJUSTMENT ASSEMBLY

BACKGROUND

The present invention relates to adjustment assemblies for actuators, and more particularly to adjustment assemblies for use with ram air turbine (RAT) actuators.

Modern aircraft often include a secondary or emergency power system that can provide power in the event that power is unavailable from a primary power system. RATs are commonly used for secondary or emergency power systems to provide electrical and/or hydraulic power. A typical RAT is deployable in flight by opening suitable doors or hatches in the aircraft's fuselage. The RAT presents a rotatable turbine to oncoming airflow, which rotates the turbine. Rotational energy (torque) from the turbine is then transmitted to a suitable power conversion device (e.g., generator, pump, etc.) that converts that rotational energy to a desired form for use by the aircraft.

RATs commonly include an actuator assembly with a spring bias mechanism and a hydraulic cylinder. The spring bias member can provide force to move the RAT from a stowed position to a deployed position, when a stow-lock mechanism is released. The hydraulic cylinder can be used to retract the RAT from the deployed position to the stowed position.

The RAT stowage compartment (or bay) and its access door(s) are sized to stow the RAT and its actuator assembly with only relatively small clearances. Operators must generally adjust RAT actuator assemblies in order to ensure that the RAT does not contact other components. Typical adjustment of prior art RAT actuator assemblies was accomplished by rotating a threaded link member in half turn increments. The threaded link had an attachment that connects to a clevis member, and therefore to permit attachment to the clevis could only be adjusted in half turn increments. Half turn increments provided only coarse actuator adjustment. A deploy cylinder of the hydraulic cylinder is then turned to make a fine adjustment. Both of these adjustments required disconnection of certain parts to allow for threaded rotation.

Furthermore, RAT actuator assemblies are traditionally adjusted for overall length only in the deployed position, where the spring load is minimized so there is no adverse wear on the locking pawls. Adjustment in the stowed position is not recommended because of pawl wear, because of the extra friction load imposed by a loaded actuation spring. Also, operator safety has dictated RAT actuator adjustment only in the deployed position, because disconnecting actuator assemblies for threaded rotation under high actuator spring loading may present dangers.

The RAT-to-door clearance change may be different from one adjustment to the next, due to a non-linear door spring rate. The need to adjust the RAT only in the deployed position, coupled with spacing sensitivities in the stowed position generally leads to a tedious measure/deploy/adjust/stow cycle, which may need to be repeated numerous times before desired RAT-to-door spacing is achieved. Thus, an alternative RAT adjustment mechanism is desired.

SUMMARY

A ram air turbine system according to the present invention includes an actuator having a threaded portion, a rod having a threaded region at or near one end and an eyelet at an opposite end, and a bushing. The bushing has a first thread engaged with the threaded portion of the actuator, and a second thread engaged with the threaded region of the rod, such that an actuation force can be transmitted between the actuator and the rod through the bushing. The first and second threads of the bushing have different pitches.

Figure 1:
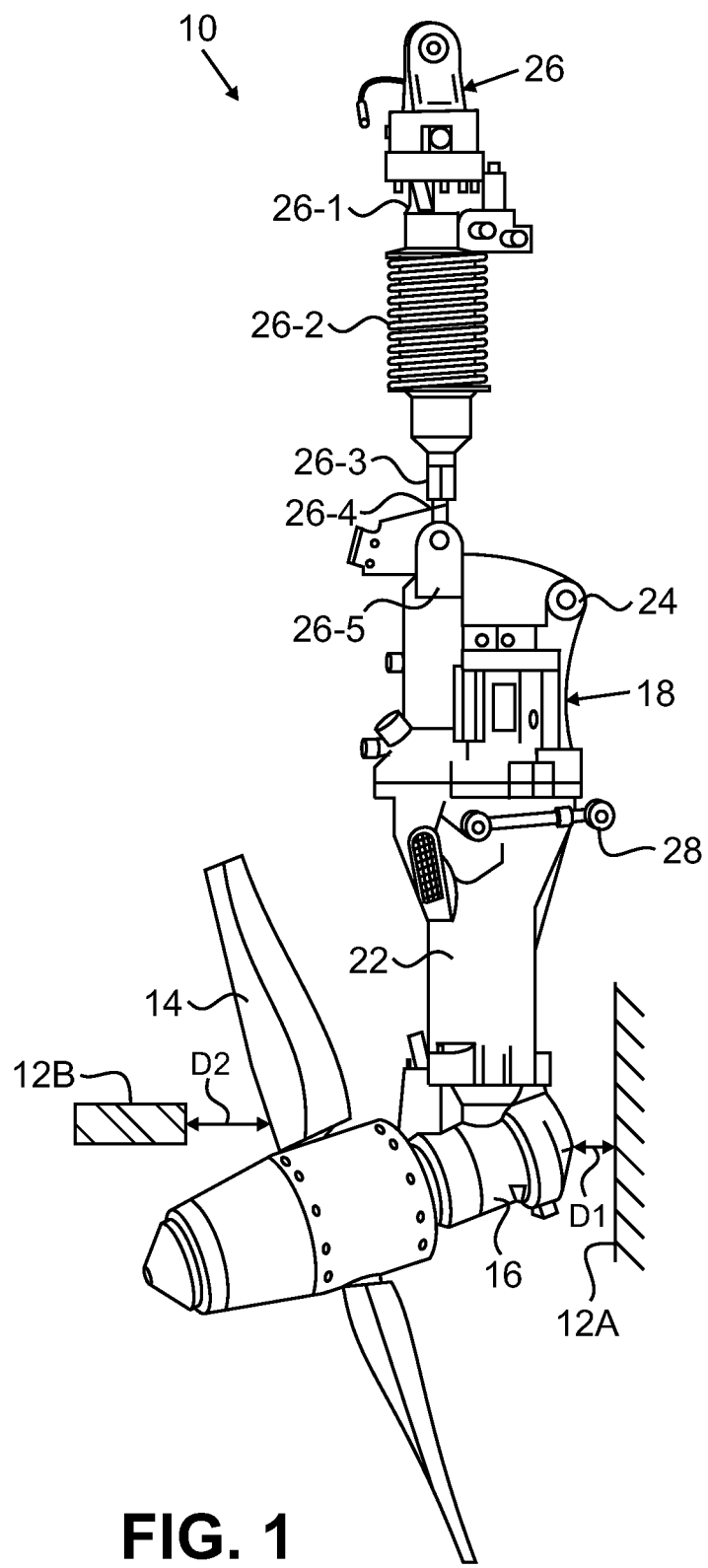
FIG. 1 is a perspective view of a ram air turbine (RAT) assembly.

While the above-identified drawing figures set forth embodiments of the invention, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings.

DETAILED DESCRIPTION

FIG. 1 is a perspective view of an embodiment of a ram air turbine (RAT) assembly 10, which can be mounted relative to one or more airframe elements 12A and 12B (illustrated schematically), and is deployable between a stowed position for storage when not in use and a deployed position to provide power (e.g., electric or hydraulic power). The RAT assembly 10 can be similar to that disclosed in U.S. Patent Application Publication No. 2011/0236218. FIG. 1 illustrates the RAT assembly 10 in a stowed position. The RAT assembly 10 includes a turbine 14, a gearbox 16, a generator 18, a hydraulic pump 20, a strut 22, a pivot post (or swivel post) 24, an actuator assembly 26, and a door linkage 28. Other components not specifically identified can also be included with the RAT assembly 10. The RAT 10 illustrated in FIG. 1 is shown merely by way of example and not limitation. Those of ordinary skill in the art will recognize that other RAT configurations are possible.

The turbine 14 is supported at the end of strut 22. The strut 22 is mounted relative to the airframe elements 12A and 12B with the swivel post 24, which allows pivotal movement of the turbine 14, strut 22, etc. The door linkage 28 can connect to a door, such that deployment of the RAT 10 simultaneously opens a door along aircraft fuselage. In one embodiment the airframe element 12A can be a door, and can be connected to the door linkage 28 to open when the RAT 10 is deployed. When the RAT 10 is stowed, clearance distances such as distances D1 and D2 are present between a portion of the RAT 10 and the airframe elements 12A and 12B, respectively. Because of non-linear spring rates of a spring that biases the airframe element 12A (when that element is a door), the clearance distance D1 may be somewhat unpredictable and in need of measurement and adjustment. It should be noted that particular clearance distances of interest will vary for particular applications, based on the particular configuration of the RAT 10 and the particular configuration of an installation location (e.g., RAT compartment space within an aircraft), for instance.

During flight, the turbine 14 can rotate responsive to air flow along the outside of the airframe (represented by elements 12A and 12B). Rotational power from the turbine 14 can be transmitted through the gearbox 16 to both the generator 18 and the hydraulic pump 20 for operation. The hydraulic pump 20 can be coupled to the generator 18 such that the hydraulic pump 20 rotates at the same speed as the generator 18.

The actuator assembly 26 includes an actuator cylinder 26-1, a spring 26-2, a bushing 26-3, a rod 26-4, and an attachment structure 26-5. The actuator cylinder 26-1 can form a part of a hydraulic mechanism that can act as a shock absorber to control RAT movement during deployment, and/or provide other functions. The spring 26-2 can provide a biasing force to the RAT 10 in order to deploy the RAT 10 when a locking mechanism (e.g., locking pawl) is released (the locking mechanism is not specifically shown). The bushing 26-3 and the rod 26-4 are engaged to the cylinder 26-1, with the rod 26-4 connected to the attachment structure 26-5, which can be a clevis or yoke. The attachment structure 26-5 provides a fixed attachment for the body of the RAT 10 that includes the turbine 14, generator 18, pump 20 and strut 22, such that the body of the RAT 10 can pivot at the pivot post 24 is response to force applied by the actuator assembly 26. The pivoting connection of the attachment structure 26-5 and the pivot post 24 can be similar to a known design, such as that disclosed in commonly-assigned U.S. Pat. No. 7,416,392 or commonly-assigned U.S. Pat. App. Pub. No. 2011/0236218.

Figure 2:
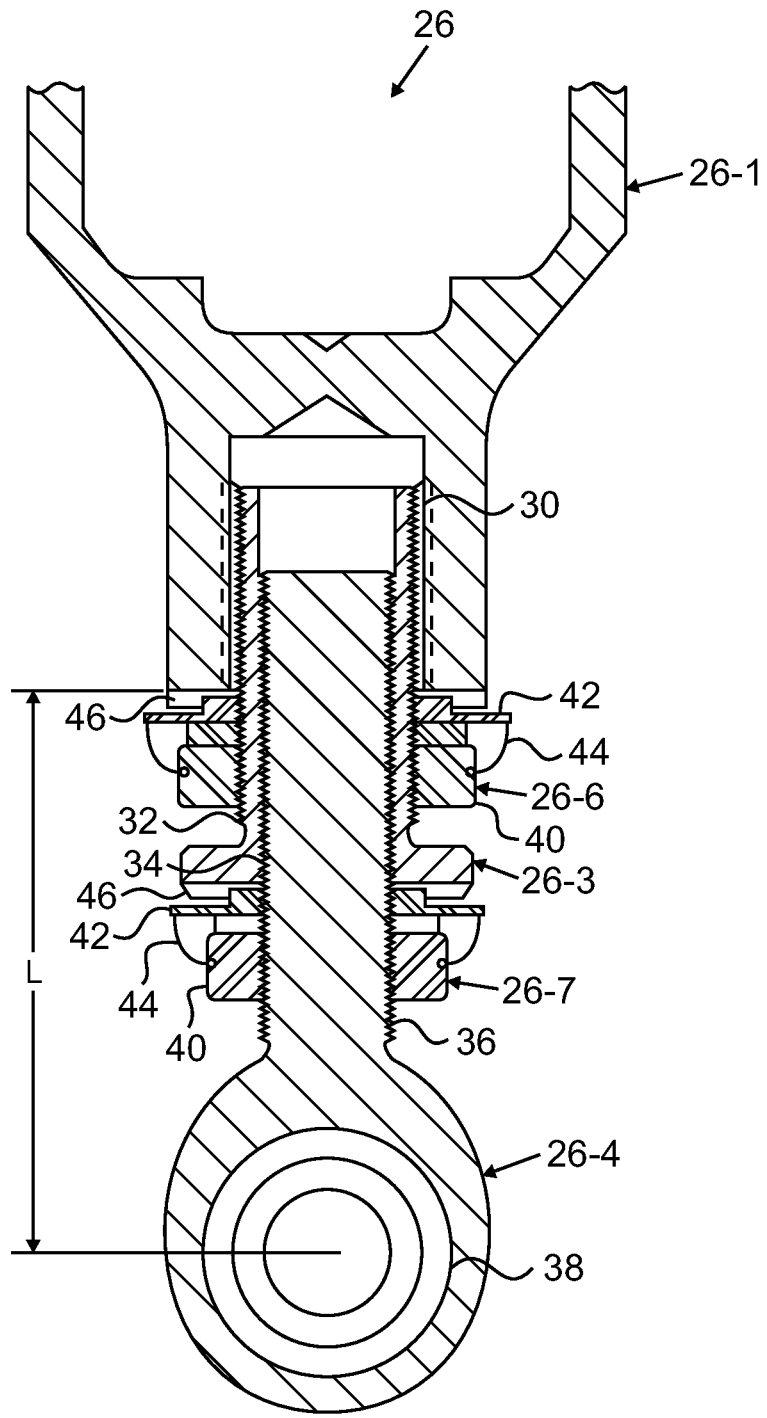
FIG. 2 is a cross-sectional view of one embodiment of a RAT actuator adjustment mechanism of the present invention.

FIG. 2 is a cross-sectional view of one embodiment of a RAT actuator adjustment mechanism of the assembly 26. In the illustrated embodiment, the cylinder 26-1 has a fitting with a threaded portion 30 having an internal thread, the bushing 26-3 has both a first thread 32, configured as an external thread, and a second thread 34, configured as an internal thread, and the rod 26-4 has a threaded region 36 with an external thread. The cylinder 26-1 can be held rotationally fixed through a fixed mounting connection to an airframe mounting location (not shown in FIG. 2). The bushing 26-3 acts as a mating connector threadably engaged between the cylinder 26-1 and the rod 26-4. The bushing 26-3 as shown in the embodiment of FIG. 2 is positioned radially in between the threaded portion 30 of the cylinder 26-1 and the threaded region 36 of the rod 26-4 in a coaxial arrangement. During operation, the bushing 26-3 transmits generally axial loads between the cylinder 26-1 and the rod 26-4.

The rod 26-4 includes a rod end eyelet 38, in which a monoball or spherical bearing can be positioned, allowing for connection to the attachment structure 26-5. The rod end eyelet 38 can be located at an end of the rod 26-4 generally opposite to an end at (or near) which the threaded region 36 is located. When connected to the attachment structure 26-5, the rod 26-4 is rotationally fixed or stationary, which prevents adjustment of a length L between an end of the cylinder 26-1 and a centerline of the rod end eyelet 38. Adjustment of the length L can control the clearance distance D (see FIG. 1).

The threads 30 and 32 can be configured with coarse pitch and the threads 34 and 36 can be configured with fine pitch. Fine and coarse pitches can be selected from suitable thread pitch standards, or with any other particular pitches, as desired for particular applications. Having different thread pitches allows for differential adjustment of the actuator assembly 26. Coarse adjustment (i.e., relatively large distance adjustments) of the length L can be accomplished in a conventional manner when the RAT 10 is in a deployed position, by disconnecting the rod 26-4 from the attachment structure 26-5 and rotating the rod 26-4 in half turns. In order to produce fine adjustment, the bushing 26-3 can be rotated while the cylinder 26-1 and the rod 26-4 both remain rotationally fixed. The bushing 26-3 can include flats for tool (e.g., wrench) engagement or other suitable structures to facilitate rotation. Because the bushing 26-3 is not limited to half-turn increments, nearly continuous adjustment increments can be made, down to approximately 25.4 µm (0.001 inch) increments. Because of the differential (coarse vs. fine) thread pitch, half turn rotation of the bushing 26-3 will adjust the distance L less than if the rod 26-4 were rotated the same half turn rotation. Fine adjustment in this manner allows the clearance distance D to be measured and adjusted without deploying the RAT 10, whereby providing a simpler and easier means of RAT adjustment over the prior art. The following example illustrates adjustment of the distance L in one embodiment. If the rod 26-4 had a 0.500-20 thread in the threaded region 36 and the cylinder 26-1 thread was 0.750-16 in the threaded portion 30, coarse adjustment of the rod 26-4 in half turn increments would change the distance L by 0.064 cm (0.025 inches) (½₀×½). For fine adjustment, the threaded bushing 26-3 may turn one-quarter turn, causing the bushing 26-3 to extend by 1/16/4=0.0396 cm (0.0156 inches) and the rod 26-4 to retract into the bushing 26-3 by 1/20/4=0.0318 cm (0.0125 inches). The net fine adjustment (ΔL) for one-quarter turn of the bushing 26-3 is then (0.0031 inches) (0.0156-0.0125 inches). Persons of ordinary skill in the art will appreciate that turning the bushing 26-3 at other increments can produce other adjustments to the distance L.

Fine adjustment (i.e., relatively small distance adjustments) can be accomplished when the RAT 10 is in the stowed position, while the spring 26-2 continues to apply a biasing force (e.g., 3.56 kN or 800 lbs) and while the cylinder 26-1 and the rod 26-4 both remain rotationally fixed and connected to respective attachment structures. Fine adjustment can also or in the alternative be performed in the deployed position in the same manner, as desired.

In order to hold the actuator assembly 26 at a given adjustment, locking devices can be provided. A first locking device 26-6 and a second locking device 26-7 can each be engaged with the bushing 26-3. The first locking device 26-6 can be engaged between the cylinder 26-1 and the bushing 25-3, to rotationally fix the bushing 26-3 relative to the cylinder 26-1. The first locking device 26-6 can be engaged to preclude undesired part rotation. The second locking device 26-7 can be engaged between the bushing 26-3 and the rod 26-4, to rotationally fix the bushing 26-3 relative to the rod 26-4. The second locking device 26-7 can be engaged to preclude undesired part rotation. The locking devices 26-6 and 26-7 can also preload the threads 30, 32, 34, 36 to help reduce fatigue stress. The locking devices 26-6 and 26-7 can each be selectively removed to allow for desired adjustments.

In the illustrated embodiment, each locking device 26-6 and 26-7 has a multi-part construction. For the first device 26-6, a nut 40, a splined ring 42, and a tether 44 are provided. The splined ring 42 can seat against the bushing 26-3, and respective splines 46 on the ring 42 and the bushing 26-3 engage each other to restrict rotational movement. The nut 40 can be tightened to hold the splines 46 in engagement. The tether 46 can be engaged between the nut 40 and the ring 42 to restrict loosening rotation of the nut 40. The second device 26-7 can have a similar configuration to the first device 26-6, with splines 46 engaged between the ring 42 and the fitting of the cylinder 26-1. In alternative embodiments, the separate locking devices 26-6 and 26-7 can be integrated into a single device of any suitable configuration.

Figure 3:
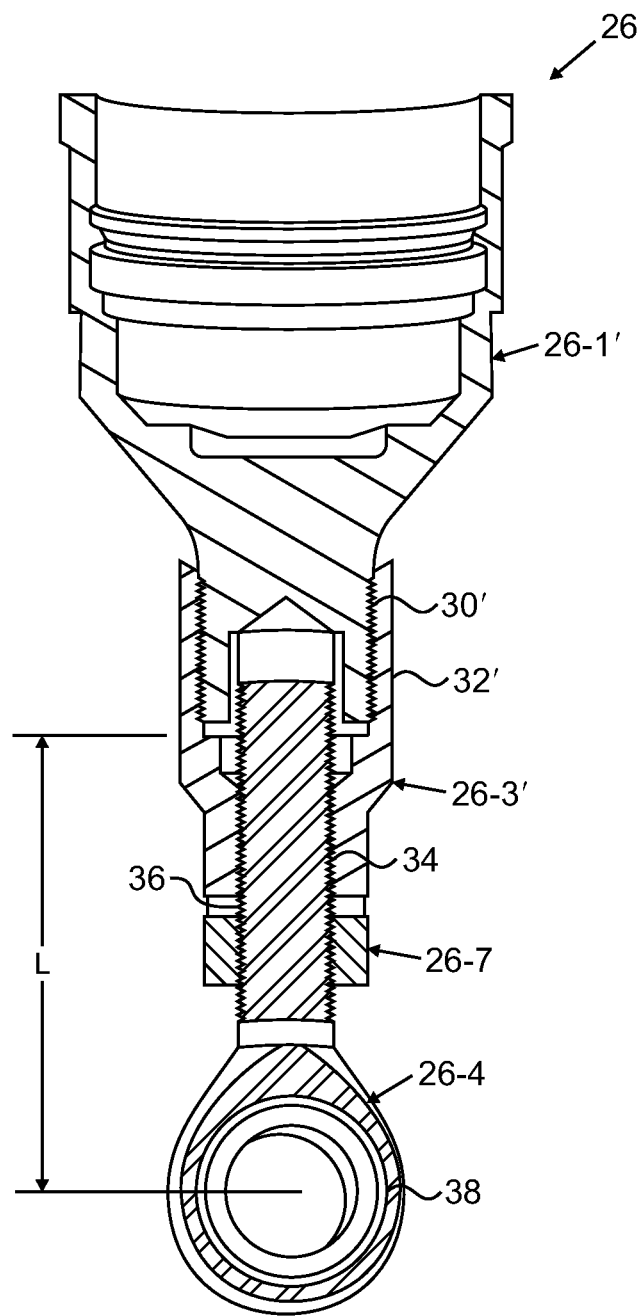
FIG. 3 is a cross-sectional view of another embodiment of a RAT actuator adjustment mechanism of the present invention.

FIG. 3 is a cross-sectional view of another embodiment of a RAT actuator adjustment mechanism of the assembly 26. In the illustrated embodiment, the cylinder 26-1' has a fitting with a threaded portion 30' having an external thread, the bushing 26-3' has both a first thread 32', configured as an internal thread, and a second thread 34, also configured as an internal thread, and the rod 26-4 has a threaded region 36 with an external thread. The threads 30' and 32' can be configured with coarse pitch and the threads 34 and 36 can be configured with fine pitch. The cylinder 26-1' can be held rotationally fixed through a fixed mounting connection to an airframe mounting location (not shown in FIG. 3). The bushing 26-3' acts as a mating connector threadably engaged between the cylinder 26-1' and the rod 26-4. The bushing 26-3 as shown in the embodiment of FIG. 3 is positioned radially outside both the threaded portion 30 of the cylinder 26-1 and the threaded region 36 of the rod 26-4 in a coaxial arrangement. The first thread 32' and the second thread 34, while both internal threads as illustrated, can have different diameters, such that the bushing 26-3 assumes a stepped configuration, as shown in cross-section. One or more rotational locking devices can be provided, such as the locking device 26-7 engaged between the bushing 26-3' and the rod 26-4.

The embodiment shown in FIG. 3 can operate in a similar manner to that described with respect to the embodiment of FIG. 2.

Any relative terms or terms of degree used herein, such as "substantially", "essentially", "generally" and the like, should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations, incidental alignment variations, and the like.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

Discussion of Possible Embodiments

The following are non-exclusive descriptions of possible embodiments of the present invention.

A ram air turbine system can include an actuator having a threaded portion; a rod having a threaded region at or near one end and an eyelet at an opposite end; and a bushing having a first thread engaged with the threaded portion of the actuator, and a second thread engaged with the threaded region of the rod, such that an actuation force can be transmitted between the actuator and the rod through the bushing, wherein the first and second threads of the bushing have different pitches.

The system of the preceding paragraph can optionally include, additionally and/or alternatively, any one or more of the following features, configurations and/or additional components:

the first thread of the bushing can have a coarse pitch, and the second thread of the bushing can have a fine pitch such that length adjustment is possible to approximately 25.4 µm (0.001 inch) increments through rotation of the bushing;

the first thread of the bushing can be an internal thread;

the first thread of the bushing can be an external thread;

the second thread of the bushing can be an internal thread;

the second thread of the bushing can be an internal thread, and the first thread can be selected from the group consisting of an internal thread and an external thread;

a first rotational locking device engaged between the actuator and the bushing; and/or a second rotational locking device engaged between the bushing and the rod.

A method for use with an actuator assembly for a ram air turbine can include providing a rod; providing a cylinder; and operably engaging a threaded bushing between the rod and the cylinder such that the rushing is rotatable relate to both the rod and the cylinder.

The method of the preceding paragraph can optionally include, additionally and/or alternatively, any one or more of the following features and/or additional steps:

securing at least one locking device to limit rotational movement of the bushing;

applying a spring load to the ram air turbine while the step of threadably adjusting the bushing is performed;

measuring a clearance distance between a portion of the ram air turbine and an airframe element while the ram air turbine is stowed; and threadably adjusting a bushing to adjust the clearance distance while the actuator remains engaged;

the step of threadably adjusting the bushing can accomplish fine adjustment after coarse adjustment has previously been completed;

during the step of threadably adjusting the bushing, a rod member of the actuator assembly having an eyelet at one end and a threaded engagement to the bushing at an opposite end is held rotationally fixed; and/or during the step of threadably adjusting the bushing, an actuator cylinder having a threaded engagement to the bushing is held rotationally fixed.

A ram air turbine system carried relative to an airframe element can include a deployable turbine assembly having a turbine supported by a strut; an actuator cylinder having a threaded portion and a spring; a rod having a threaded region at or near one end and an eyelet at an opposite end; and a bushing having a first thread engaged with the threaded portion of the actuator, and a second thread engaged with the threaded region of the rod, such that an actuation force can be transmitted between the actuator and the rod through the bushing, wherein the first thread of the bushing has a coarse pitch, wherein the second thread of the bushing has a fine pitch, and wherein the bushing is rotatably adjustable while the rod and the threaded portion of the actuator cylinder are rotationally stationary.

The system of the preceding paragraph can optionally include, additionally and/or alternatively, any one or more of the following features, configurations and/or additional components:

the first thread of the bushing can be an internal thread;

the first thread of the bushing can be an external thread;

the second thread of the bushing can be an internal thread;

the second thread of the bushing can be an internal thread, and the first thread can be selected from the group consisting of an internal thread and an external thread; and/or a first locking device engaged between the actuator cylinder and the bushing; and a second locking device engaged between the bushing and the rod.

The invention claimed is:

1. A ram air turbine system comprising:
   a hydraulic actuator having a hydraulic cylinder housing with a threaded portion;
   a rod having a threaded region at or near one end and an eyelet at an opposite end; and
   a rotatably adjustable bushing having a first thread engaged with the threaded portion of the hydraulic cylinder housing, and a second thread engaged with the threaded region of the rod, such that an actuation force can be transmitted between the hydraulic actuator and the rod through the bushing, wherein the bushing is rotatable relative to the hydraulic cylinder housing and the rod, and wherein the first and second threads of the bushing have different pitches.

2. The system of claim 1, wherein the first thread of the bushing has a coarse pitch, and wherein the second thread of the bushing has a fine pitch such that length adjustment is possible to approximately 25.4 μm (0.001 inch) increments through rotation of the bushing.

3. The system of claim 1, wherein the first thread of the bushing is an internal thread.

4. The system of claim 1, wherein the first thread of the bushing is an external thread.

5. The system of claim 4, wherein the second thread of the bushing is an internal thread.

6. The system of claim 1, wherein the second thread of the bushing is an internal thread, and wherein the first thread is selected from the group consisting of an internal thread and an external thread.

7. The system of claim 1 and further comprising:
   a first rotational locking device engaged between the actuator and the bushing.

8. The system of claim 7 and further comprising:
   a second rotational locking device engaged between the bushing and the rod.

9. A method for use with a hydraulic actuator assembly for a ram air turbine, the method comprising:
   providing a ram air turbine system having a hydraulic actuator comprising:
     a rod having a threaded region at or near one end and an eyelet at an opposite end; and
     a hydraulic cylinder housing with a threaded portion; and
   operably engaging a rotatably adjustable bushing by rotating the bushing relative to the hydraulic cylinder housing and the rod, wherein the bushing has a first thread engaged with the threaded portion of the hydraulic cylinder housing, and a second thread engaged with the threaded region of the rod, such that an actuation force can be transmitted between the actuator and the rod through the bushing, and wherein the first and second threads of the bushing have different pitches.

10. The method of claim 9 and further comprising:
    securing at least one locking device to limit rotational movement of the bushing.

11. The method of claim 9 and further comprising:
    measuring a clearance distance between a portion of the ram air turbine and an airframe element when the ram air turbine is stowed; and
    threadably adjusting the bushing to adjust the clearance distance while the hydraulic actuator remains engaged.

12. The method of claim 11, wherein the step of threadably adjusting the bushing accomplishes fine adjustment after coarse adjustment has previously been completed.

13. The method of claim 11, wherein, during the step of threadably adjusting the bushing, a rod member of the actuator assembly having an eyelet at one end and a threaded engagement to the bushing at an opposite end is held rotationally fixed.

14. The method of claim 13, wherein, during the step of threadably adjusting the bushing, the hydraulic cylinder housing, having a threaded engagement to the bushing, is held rotationally fixed.

15. A ram air turbine system carried relative to an airframe element, the system comprising:
    a deployable turbine assembly having a turbine supported by a strut;
    a hydraulic actuator having a hydraulic actuator cylinder housing having a threaded portion and a spring;
    a rod having a threaded region at or near one end and an eyelet at an opposite end; and
    a bushing having a first thread engaged with the threaded portion of the hydraulic cylinder housing, and a second thread engaged with the threaded region of the rod, such that an actuation force can be transmitted between the actuator and the rod through the bushing, wherein the first thread of the bushing has a coarse pitch, wherein the second thread of the bushing has a fine pitch, and wherein the bushing is rotatably adjustable while the rod and the threaded portion of the hydraulic cylinder housing are rotationally stationary.

16. The system of claim 15, wherein the first thread of the bushing is an internal thread.

17. The system of claim 15, wherein the first thread of the bushing is an external thread.

18. The system of claim 17, wherein the second thread of the bushing is an internal thread.

19. The system of claim 15, wherein the second thread of the bushing is an internal thread, and wherein the first thread is selected from the group consisting of an internal thread and an external thread.

20. The system of claim 15 and further comprising:
    a first locking device engaged between the hydraulic cylinder housing and the bushing; and
    a second locking device engaged between the bushing and the rod.

* * * * *